(12) United States Patent
Pesce et al.

(10) Patent No.: US 7,328,278 B2
(45) Date of Patent: Feb. 5, 2008

(54) METHOD FOR SHARING ROUTING INFORMATION AND NETWORK ELEMENT USING THE SAME

(75) Inventors: Francesco Pesce, Castelfranco Veneto (IT); Pietro Vittorio Grandi, Milan (IT)

(73) Assignee: Alcatel, Paris (FR)

( * ) Notice: Subject to any disclaimer, the term of this patent is extended or adjusted under 35 U.S.C. 154(b) by 776 days.

(21) Appl. No.: 10/286,837

(22) Filed: Nov. 4, 2002

(65) Prior Publication Data
US 2003/0154304 A1    Aug. 14, 2003

(30) Foreign Application Priority Data
Dec. 19, 2001  (EP)  .................................. 01403296

(51) Int. Cl.
*G06F 15/173* (2006.01)
(52) U.S. Cl. ...................................................... 709/238
(58) Field of Classification Search ................ 709/243, 709/244, 238
See application file for complete search history.

(56) References Cited

U.S. PATENT DOCUMENTS

| | | | | |
|---|---|---|---|---|
| 5,951,649 A | * | 9/1999 | Dobbins et al. ............ 709/238 |
| 6,085,245 A | * | 7/2000 | Kaycee et al. .............. 709/224 |
| 6,148,410 A | * | 11/2000 | Baskey et al. .................. 714/4 |
| 6,266,706 B1 | * | 7/2001 | Brodnik et al. ............. 709/242 |
| 6,570,867 B1 | * | 5/2003 | Robinson et al. ........... 370/351 |
| 6,760,777 B1 | * | 7/2004 | Agarwal et al. ............ 709/238 |
| 6,810,427 B1 | * | 10/2004 | Cain et al. ................... 709/238 |
| 6,965,569 B1 | * | 11/2005 | Carolan et al. ............. 370/238 |
| 2003/0101278 A1 | * | 5/2003 | Garcia-Luna-Aceves et al. 709/240 |

* cited by examiner

*Primary Examiner*—Jason Cardone
*Assistant Examiner*—Minh-Chau Nguyen
(74) *Attorney, Agent, or Firm*—Sughrue Mion, PLLC

(57) ABSTRACT

The method allows to share, within a network element of a telecommunication network, routing information deriving from a first routing source; the network element is of the type comprising a management agent provided with a management information database, wherein different routing information deriving from different routing sources is stored in different routing databases within the network element; according to the method, the management agent performs the steps of: a) receiving from a management manager route mapping information; b) storing into the management information database route mapping information corresponding to the received route mapping information; and c) retrieving and using the stored route mapping information for exporting said routing information from a first routing database of the first routing source and importing it into a second routing database of a second routing source.

17 Claims, 1 Drawing Sheet

METHOD FOR SHARING ROUTING INFORMATION AND NETWORK ELEMENT USING THE SAME

INCORPORATION BY REFERENCE OF PRIORITY DOCUMENT

This application is based on, and claims the benefit of, European Patent Application No. 01403296.5 filed on Dec. 19, 2001, which is incorporated by reference herein.

BACKGROUND OF THE INVENTION

1. Field of the Invention

The present invention relates to a method for sharing routing information within a network element of a telecommunication network according to the preamble of claim 1, and to a network element using the same.

2. Description of the Prior Art

In a telecommunication network the information travels across the network from network element to network element till it reaches the destination entity; each network element has generally a number of neighbouring network elements; a network element routes the information received to one of its neighbouring network elements, unless the destination entity is directly connected to it.

In the Internet Protocol world it is quite common, at least for network elements located in particular nodes of the network, that different routing protocols coexist in the same network element, for example OSPF and BGP.

Additionally, all network elements have generally at least two different sources of routes, namely: a routing protocol and the network management operator who is responsible for static and default routes and who acts through a management manager external to the network elements.

Each routing protocol maintains its private information base, that is a routing database, describing the routes learned through exchange of information with neighbouring network elements running the same routing protocol. Different routing protocols do not exchange any information spontaneously.

In those network elements running more than one routing protocol it is often necessary or useful to have at least a partial sharing of routing information deriving from different routing protocols.

In all network elements the routing protocol needs to use or share the routing information deriving from other sources, typically the static and default routes deriving from the network management operator through a network management manager; nowadays network elements of telecommunication networks always comprises a management agent adapted to communicate with a management manager in order to allow its remote management by the network operator.

The problem of sharing routing information has already been solved in commercially available telecommunication equipments.

Known solutions involve the use of a Command Line Interface (CLI) implemented in the management agent; the operator, through the management manager, can directly instruct a specified management agent to carry out a specified "redistribution command" of specified routing information.

These solutions imply a heavy task for the operator and, therefore, they are error-prone.

SUMMARY OF THE INVENTION

Therefore it is the object of the present invention to provide a method for sharing routing information that overcomes the drawbacks of the prior art solutions.

This object is achieved through the sharing method having the functionalities set out in independent claim 1.

The basic idea behind the present invention is to store route mapping information into the management information database (MIB) of the management agent and to let the management agent retrieve and use the stored route mapping information for exportation-importation of routing information in the routing databases.

According to another aspect, the present invention relates also to a processor product program and to memory means having the features set out respectively in independent claims 12 and 13, and that are specifically adapted for carrying out this sharing method.

According to still another aspect, the present invention relates also to a network element having the features set out in independent claim 14, and that is specifically adapted to carry out this sharing method.

Further advantageous aspects of the present invention are set out in the dependent claims.

The invention will become more apparent from the following description to be considered in conjunction with the accompanying drawing.

BEST MODE FOR CARRYING OUT THE INVENTION

Figure 1:
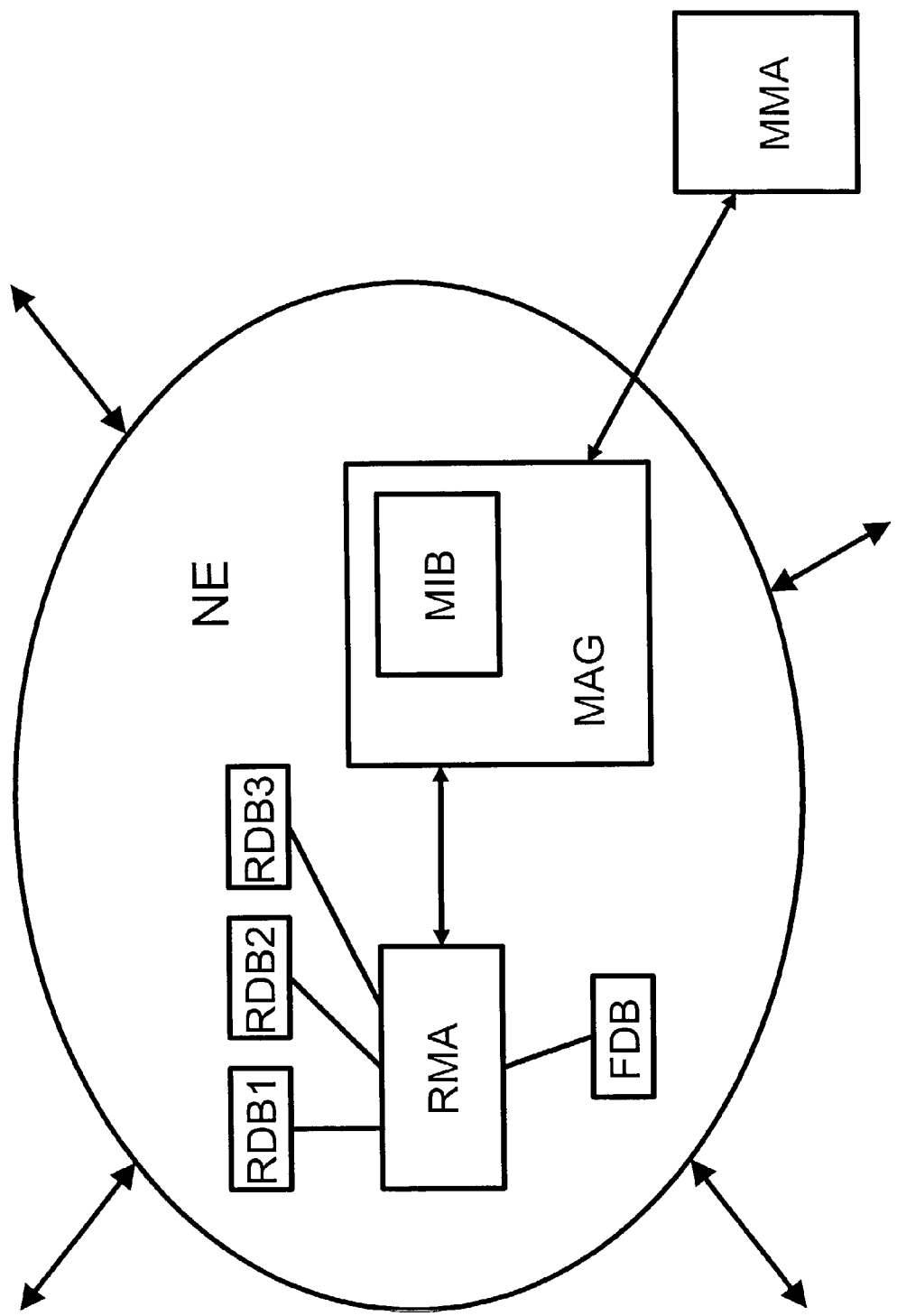
FIG. 1 shows an embodiment of a network element according to the present invention.

With reference to FIG. 1, a network element NE, according to the present invention, comprises a management agent MAG provided with a management information database, indicated in the FIGURE and generally called MIB.

The network element NE, more specifically the management agent MAG, is connected and in communication with a remote management manager MMA; management of network element NE can be carried out through one of widely spread network management protocols, in the present example through SNMP protocol.

The network element NE is connected and in communication with other network elements of the telecommunication network, that are called "neighbouring network elements" and are not shown in the FIGURE.

The network element NE of the FIGURE comprises further a route manager RMA and a number of different routing databases, e.g. three: RDB1, RDB2, RDB3, . . . Database RDB1 may be a OSPF routing database, database RDB2 may be a BGP routing database, database RDB3 may be a "static and default routes" routing database. These databases contains routing information deriving from different routing sources: according to the example, database RDB1 contains information deriving from OSPF protocol, database RDB2 contains information deriving from BGP protocol, database RDB3 contains information deriving from the management manager MMA. The route manager RMA has the task of managing the different routing databases RDB1, RDB2, RDB3.

The network element NE of the FIGURE comprises further a forwarding database FDB that is also managed or, at least, accessed by the route manager RMA.

The management agent MAG and the route manager RMA are in communication between each other for carrying out exportation-importation of routing information.

As it should be apparent, the route manager RMA may alternatively be part of the management agent MAG: e.g. be a software module of agent software program.

Now, the method according to the present invention will be described in the following with reference to the FIGURE; this reference should not be considered limitative in any sense.

The method according to the present invention allows to share, within a network element of a telecommunication network, such as network element NE of the FIGURE, routing information deriving from a first routing source, e.g. the OSPF routing protocol.

According to the method, management agent MAG performs the steps of:

a) receiving from management manager MMA route mapping information;

b) storing into management information database MIB route mapping information corresponding to the received route mapping information; and c) retrieving and using the stored route mapping information for exporting said routing information from a first routing database, e.g. RDB1, of the first routing source, e.g. the OSPF protocol, and importing it into a second routing database, e.g. RDB2, of a second routing source, e.g. the BGP protocol.

As already mentioned, different routing databases RDB1, RDB2, RDB3 may be advantageously managed by route manager RMA; in this case, management agent MAG instructs route manager RMA to carry out exportation-importation of routing information instead of acting directly on these databases.

The first routing source may be a routing protocol running within network element NE.

Alternatively, the first routing source may be a routing protocol running within any neighbouring network element in the telecommunication network.

When the first and second routing sources are of the same kind, e.g. two OSPF routing protocols running on different network elements, it could happen that routing information coming from the neighbour may be used as it is, i.e. without the need of any processing; anyway, even in this case, it is advantageous to use the method according the present invention and "re-map" the routes.

The first routing source may also be a management manager MMA external to network element NE; a management manager (and the associated operator) is usually responsible for static and default routes.

As it is apparent from what above, the method according to the present invention is widely applicable to many different cases.

The task of continuously sharing routing information between different sources/databases is entrusted to the management agents of the network elements and the operator has to communicate to the agents how to carry out the sharing only once or, at least, very seldom.

The route mapping information stored in MIB database may comprise information relating to at least one mapping rule; in general, several mapping rules are necessary to appropriately describe the required mapping.

The or each mapping rule stored in MIB database may advantageously comprise information relating to:

a set rule for conversion of routing information, particularly for metric conversion; and a match rule indicating to which routing information said set rule applies.

The or each mapping rule may advantageously comprise further information relating to:

an exportation routing source, and an importation routing source.

The or each mapping rule may advantageously comprise further information relating to:

an activation flag indicating whether the corresponding mapping rule is actually to be used for exportation-importation;

in fact, it is useful to leave to the operator the possibility to activate and deactivate some mapping rules depending on the operating conditions of the network.

The or each mapping rule may advantageously comprise further information relating to:

a selection flag indicating whether the corresponding match rule applies or do not applies;

this option is useful for describing complex mapping strategies; for example, it may be necessary to share a whole big set of routing information with the exception of three limited sets of routing information; in this case, four mapping rules may be used: the first one having a positive selection flag and the other three having a negative selection flag.

In order to increase the complexity of mapping strategies, each mapping rule may advantageously comprise further information relating to:

an index indicating the order of precedence of the corresponding mapping rule;

in this case, the management agent scans the stored route mapping information following the index and, as soon as a matching mapping rule is encountered, the corresponding mapping is carried out; in this case the operator has to carefully study the index assigned to every mapping rule in order to achieve the desired mapping; typically, the default route should be the last to be examined by the agent.

For processing purposes, it is advantageous that route mapping information is stored within management information database MIB as a table; in this case, each entry (it could be a row or a column) in the table corresponds to a different mapping rule.

For processing purposes, it is advantageous that the information relating to a match rule consists in a pointer to an entry in at least one match rule table comprised in management information database MIB.

For processing purposes, it is advantageous that the information relating to a set rule consists in a pointer to an entry in at least one set rule table comprised in management information base MIB.

It is advantageous that the management agent carries out (directly or indirectly) exportation-importation of routing information taking into account eventual import-export blocking information stored, preferably as a table, within management information database MIB; the blocking information identifies at least one couple of routing sources; the blocking information overrides the route mapping information. This option is useful in order to leave to the operator the possibility of blocking some kind of mapping in particular operating conditions of the network.

In case of "re-mapping", it is useful that the match rule indicates:

to which routing network addresses the corresponding set rule applies;

whether the exportation routing source is internal or external to said network element;

whether the importation routing source is internal or external to said network element; and to which external routing source or sources the corresponding set rule applies;

this last parameter can be considered as a "host list"; the list may refer to a "host table".

Each entry in a match rule table may comprise information relating to at least:

a destination network address, and a destination network address mask.

Other fields of this table, that may increase the flexibility of the match rule, are mentioned and explained in the detailed SNMP description listed later on.

Each entry in a set rule table may comprise information relating to at least:

a metric value, and a metric scale.

Other fields of this table, that may increase the flexibility of the set rule, are mentioned and explained in the detailed SNMP description listed later on.

The method according to the present invention would be implemented in software in a commercial network element.

Therefore, according to another aspect, the present invention relates also to a processor program product comprising program code portions adapted to perform the steps of this sharing method when executed by a processor of network element NE.

Such a software program may be splitted in modules that call each other or communicate between each other, as it is common; some of these modules may indeed be external to the program and be bought on the market from specialized software developer.

According to a further aspect, the present invention relates also to memory means (e.g., a floppy disk or an EPROM memory device, . . . ) storing a processor program product comprising program code portions adapted to perform the steps of this sharing method when executed by a processor of network element NE.

According to still a further aspect, the present invention relates also to a network element NE provided with a management information database MIB and comprising a management agent MAG, wherein the management information database MIB is adapted to store route mapping information and in that the management agent MAG is adapted to carry out this sharing method.

In the following the SNMP description is listed of data structures used for storing route mapping information according to a specific embodiment of the present invention where two routing sources are provided: OSPF protocol and management manager; it is easy to introduce a second routing protocol, e.g. BGP.

routeMapTable OBJECT-TYPE
SYNTAX SEQUENCE OF RouteMapEntry
MAX-ACCESS not-accessible
STATUS current
DESCRIPTION "Information describing a generic rule consisting of filters and conditions to be applied when exporting routes from a routing protocol (or a default route) to another protocol"
::={xxx xxx}
RouteMapEntry OBJECT-TYPE
SYNTAX RouteMapEntry
MAX-ACCESS not-accessible
STATUS current
DESCRIPTION "An entry in the generic rule for route export activities"
INDEX {routeMapFromProtocol, routeMapToProtocol, routeMapId}
::={routeMapTable 1}
RouteMapEntry::=
SEQUENCE {routeMapFromProtocol INTEGER,
routeMapToProtocol INTEGER,
routeMapId INTEGER,
routeMapScanner INTEGER,
routeMapMatchRule INTEGER,
routeMapSetRule INTEGER,
routeMapAllow TruthValue,
routeMapRowStatus RowStatus}
routeMapFromProtocol OBJECT-TYPE
SYNTAX INTEGER {defaultRoute (1),
staticRoute (3),
osfp (13),
bgp (14)}
MAX-ACCESS not-accessible
STATUS current
DESCRIPTION "This field is used to identify the protocol that is exporting the routes"
::={RouteMapEntry 1}
routeMapToProtocol OBJECT-TYPE
SYNTAX INTEGER {osfp (13),
bgp (14)}
MAX-ACCESS not-accessible
STATUS current
DESCRIPTION "This field is used to identify the protocol that is importing the routes"
::={RouteMapEntry 2}
routeMapId OBJECT-TYPE
SYNTAX INTEGER
MAX-ACCESS not-accessible
STATUS current
DESCRIPTION "This field is used to identify a record in a sequence of rules. The value restarts from 1 in any different sequence identified by the exporting and importing protocols"
::={RouteMapEntry 3}
routeMapScanner OBJECT-TYPE
SYNTAX INTEGER
MAX-ACCESS read-create
STATUS current
DESCRIPTION "This field is used to identify the sequence order in which the rules must be applied"
::={RouteMapEntry 4}
routeMapMatchRule OBJECT-TYPE
SYNTAX INTEGER
MAX-ACCESS read-create
STATUS current
DESCRIPTION "This field identifies the filters that must be applied to the route data. The association between the protocol and the filter table is implicit. The value of this field is equal to the value of the identifier field of the protocol dependent filter table. The value −1 indicates that no filter is associated to this entry. When a default route is exported this field has always value −1"
::={RouteMapEntry 5}
routeMapSetRule OBJECT-TYPE SYNTAX INTEGER
MAX-ACCESS read-create
STATUS current
DESCRIPTION "This field identifies the conditions that must be applied to the routes that match the protocol dependent filters. The association between the protocol and the condition table is implicit. The value of this field is equal to the value of the identifier field of the protocol dependent condition table. The value −1 indicates that no rule is associated to this entry. Whenever the user does not allow a route to be exported, this field has always value −1. In case the export of the route is allowed and the value of routeMapMatchRule is different from −1, a value of −1 in this field indicates that the route is exported applying all the defaults associated to the set rule of the routeMapToProtocol. In case the value of the routeMapFromProtocol field is equal to the value of the routeMapToProtocol field, this field can have a value of −2 indicating that there is no rule is associated to the entry and NO default is applied"
::={RouteMapEntry 6}
routeMapAllow OBJECT-TYPE
SYNTAX TruthValue
MAX-ACCESS read-create
STATUS current
DESCRIPTION "This field is needed to allow the export of the routes (value True) or to forbid the export of the routes (value False) matching the protocol dependent rules"
::={RouteMapEntry 7}
routeMapRowStatus OBJECT-TYPE
SYNTAX RowStatus
MAX-ACCESS read-create
STATUS current
DESCRIPTION "This variable displays the status of the entry. Disabled entries are not taken into account when performing export activities."
::={RouteMapEntry 8}
staticRouteMatchRuleTable OBJECT-TYPE
SYNTAX SEQUENCE OF StaticRouteMatchRuleEntry
MAX-ACCESS not-accessible
STATUS current
DESCRIPTION "Information describing filters that can be applied when selecting static routes to be exported to other protocols"
::={xxx xxx}
staticRouteMatchRuleEntry OBJECT-TYPE
SYNTAX StaticRouteMatchRuleEntry
MAX-ACCESS not-accessible
STATUS current
DESCRIPTION "An entry in the filter table for exported static routes"
INDEX {staticRouteMatchRuleId}
::={staticRouteMatchRuleTable 1}
StaticRouteMatchRuleEntry::=
  SEQUENCE {staticRouteMatchRuleId INTEGER,
    staticRouteMatchRuleMask BITS,
    staticRouteMatchRuleIpAddr IpAddress,
    staticRouteMatchRuleIpMask IpAddress,
    staticRouteMatchRuleNHAddr IpAddress,
    staticRouteMatchRuleNHMask IpAddress,
    staticRouteMatchRuleMetricLo INTEGER,
    staticRouteMatchRuleMetricHi INTEGER,
    staticRouteMatchRuleRowStatus RowStatus}
staticRouteMatchRuleId OBJECT-TYPE
SYNTAX INTEGER
MAX-ACCESS not-accessible
STATUS current
DESCRIPTION "This field is used to identify an entry. An entry is associated to a rule when the routeMapMatchRule field of a routeMapTable entry contains the same value reported in this field"
::={staticRouteMatchRuleEntry 1}
staticRouteMatchRuleMask OBJECT-TYPE
SYNTAX BITS {destinationAddressFilter (0),
    nextHopAddressFilter (1),
    metricValueFilter (2)}
MAX-ACCESS read-create
STATUS current
DESCRIPTION "This field is used to select the filters that must be applied"
::={staticRouteMatchRuleEntry 2}
staticRouteMatchRuleIpAddr OBJECT-TYPE
SYNTAX IpAddress
MAX-ACCESS read-create
STATUS current
DESCRIPTION "This field contain a destination address to be used together with the destination address mask in order to select routes toward a range of destination addresses all resident in the same subnet. This field is meaningful only in case the destinationAddressFilter bit in the staticRouteMatchRuleMask is set"
::={staticRouteMatchRuleEntry 3}
staticRouteMatchRuleIpMask OBJECT-TYPE
SYNTAX IpAddress
MAX-ACCESS read-create
STATUS current
DESCRIPTION "This field contain a destination address mask to be used together with the destination address in order to select routes toward a range of destination addresses all resident in the same subnet. An "all one" mask is needed to select a single address. An "all zero" mask is needed to create an entry that selects all the addresses. The all zero mask is useful when creating the last entry in a sequence of rules to specify what to do if all the previous filters do not match. This field is meaningful only in case the destinationAddressFilter bit in the staticRouteMatchRuleMask is set"
::={staticRouteMatchRuleEntry 4}
staticRouteMatchRuleNHAddr OBJECT-TYPE
SYNTAX IpAddress
MAX-ACCESS read-create
STATUS current
DESCRIPTION "This field contain a next hop address to be used together with the next hop address mask in order to select routes toward a range of next hop addresses all resident in the same subnet. This field is meaningful only in case the nextHopAddressFilter bit in the staticRouteMatchRuleMask is set"
::={staticRouteMatchRuleEntry 5}
staticRouteMatchRuleNHMask OBJECT-TYPE
SYNTAX IpAddress
MAX-ACCESS read-create
STATUS current
DESCRIPTION "This field contain a next hop address mask to be used together with the next hop address in order to select routes toward a range of next hop addresses all resident in the same subnet. An "all one" mask is needed to select a single address. An "all zero" mask is needed to create an entry that selects all the addresses. The all zero mask is useful when creating the last entry in a sequence of rules to specify what to do if all the previous filters do not match. This field is meaningful only in case the nextHopAddressFilter bit in the staticRouteMatchRuleMask is set"
::={staticRouteMatchRuleEntry 6}
staticRouteMatchRuleMetricLo OBJECT-TYPE
SYNTAX INTEGER
MAX-ACCESS read-create
STATUS current
DESCRIPTION "This field contain a lower metric value to be used for a metric filter. In order to match, routes must have a metric value higher or equal to the value reported in this field. This field is used together with staticRouteMatchRuleMetricHi to identify a range of metrics. In order to identify a single value, staticRouteMatchRuleMetricLo and staticRouteMatchRuleMetricHi must have the same value. This field is meaningful only in case the metricValueFilter bit in the staticRouteMatchRuleMask is set"
::={staticRouteMatchRuleEntry 7}
staticRouteMatchRuleMetricHi OBJECT-TYPE
SYNTAX INTEGER
MAX-ACCESS read-create
STATUS current
DESCRIPTION "This field contain a lower metric value to be used for a metric filter. In order to match, routes must have a metric value less or equal to the value reported in this field. This field is used together with staticRouteMatchRuleMetricLo to identify a range of metrics. In order to identify a single value, static RouteMatchRuleMetricLo and staticRouteMatchRuleMetricHi must have the same value. This field is meaningful only in case the metricValueFilter bit in the staticRouteMatchRuleMask is set"
::={staticRouteMatchRuleEntry 8}
staticRouteMatchRuleRowStatus OBJECT-TYPE
SYNTAX RowStatus
MAX-ACCESS read-create
STATUS current
DESCRIPTION "This variable displays the status of the entry. Disabled entries are not taken into account when performing filter activities."
::={staticRouteMatchRuleEntry 9}
ospfMatchRuleTable OBJECT-TYPE
SYNTAX SEQUENCE OF OspfMatchRuleEntry
MAX-ACCESS not-accessible
STATUS current
DESCRIPTION "Information describing filters that can be applied when selecting ospf routes to be exported to other protocols"
::={xxx xxx}
ospfMatchRuleEntry OBJECT-TYPE
SYNTAX OspfMatchRuleEntry
MAX-ACCESS not-accessible
STATUS current
DESCRIPTION
  "An entry in the filter table for exported ospf routes"
INDEX {ospfMatchRuleId}
::={ospfMatchRuleTable 1}
OspfMatchRuleEntry::=
  SEQUENCE {ospfMatchRuleId INTEGER,
    ospfMatchRuleMask BITS,
    ospfMatchRuleIpAddr IpAddress,
    ospfMatchRuleIpMask IpAddress,
    ospfMatchRuleNHAddr IpAddress,
    ospfMatchRuleNHMask IpAddress,
    ospfMatchRuleMetricType INTEGER,
    ospfMatchRuleMetricLo INTEGER,
    ospfMatchRuleMetricHi INTEGER,
    ospfMatchRuleTagLo INTEGER,
    ospfMatchRuleTagHi INTEGER,
    ospfMatchRuleDirection INTEGER,
    ospfMatchRuleAddressList INTEGER,
    ospfMatchRuleRowStatus RowStatus}
ospfMatchRuleId OBJECT-TYPE
SYNTAX INTEGER
MAX-ACCESS not-accessible
STATUS current
DESCRIPTION "This field is used to identify an entry. An entry is associated to a rule when the routeMapMatchRule field of a routeMapTable entry contains the same value reported in this field"
::={ospfMatchRuleEntry 1}
ospfMatchRuleMask OBJECT-TYPE
SYNTAX BITS {destinationAddressFilter (0),
  nextHopAddressFilter (1),
  metricTypeFilter (2)
  metricValueFilter (3),
  tagValueFilter (4),}
MAX-ACCESS read-create
STATUS current
DESCRIPTION "This field is used to select the filters that must be applied. In case routeMapFromProtocol and routeMapToProtocol in a routeMapTable's row have both value 'ospf', the directionFilter bit must be set"
::={ospfMatchRuleEntry 2}
ospfMatchRuleIpAddr OBJECT-TYPE
SYNTAX IpAddress
MAX-ACCESS read-create
STATUS current
DESCRIPTION "This field contain a destination address to be used together with the destination address mask in order to select routes toward a range of destination addresses all resident in the same subnet. This field is meaningful only in case the destinationAddressFilter bit in the ospfMatchRuleMask is set"
::={ospfMatchRuleEntry 3}
ospfMatchRuleIpMask OBJECT-TYPE
SYNTAX IpAddress
MAX-ACCESS read-create
STATUS current
DESCRIPTION "This field contains a destination address mask to be used together with the destination address in order to select routes toward a range of destination addresses all resident in the same subnet. An "all one" mask is needed to select a single address. An "all zero" mask is needed to create an entry that selects all the addresses. The all zero mask is useful when creating the last entry in a sequence of rules to specify what to do if all the previous filters do not match. This field is meaningful only in case the destinationAddressFilter bit in the ospfMatchRuleMask is set"
::={ospfMatchRuleEntry 4}
ospfMatchRuleNHAddr OBJECT-TYPE
SYNTAX IpAddress
MAX-ACCESS read-create
STATUS current
DESCRIPTION "This field contain a next hop address to be used together with the next hop address mask in order to select routes toward a range of next hop addresses all resident in the same subnet. This field is meaningful only in case the nextHopAddressFilter bit in the ospfMatchRuleMask is set"
::={ospfMatchRuleEntry 5}
ospfMatchRuleNHMask OBJECT-TYPE
SYNTAX IpAddress
MAX-ACCESS read-create
STATUS current
DESCRIPTION "This field contain a next hop address mask to be used together with the next hop address in order to select routes toward a range of next hop addresses all resident in the same subnet. An "all one" mask is needed to select a single address. An "all zero" mask is needed to create an entry that selects all the addresses. The all zero mask is useful when creating the last entry in a sequence of rules to specify what to do if all the previous filters do not match. This field is meaningful only in case the nextHopAddressFilter bit in the ospfMatchRuleMask is set"
::={ospfMatchRuleEntry 6}
ospfMatchRuleMetricType OBJECT-TYPE
SYNTAX INTEGER {ospfExternalType1 (1),
    ospfExternalType2 (2),
    ospfInternal (3)}
MAX-ACCESS read-create
STATUS current
DESCRIPTION "This field contains the kind of metric that must be matched when OSPF is importing/exporting routes. The value ospfInternal is valid only in case OSPF is importing/exporting to OSPF. This field is meaningful only in case the metricTypeFilter bit in the ospfMatchRuleMask is set"
::={ospfMatchRuleEntry 7}
ospfMatchRuleMetricLo OBJECT-TYPE
SYNTAX INTEGER
MAX-ACCESS read-create
STATUS current
DESCRIPTION "This field contain a lower metric value to be used for a metric filter. In order to match, routes must have a metric value higher or equal to the value reported in this field. This field is used together with staticRouteMatchRuleMetricHi to identify a range of metrics. In order to identify a single value, ospfMatchRuleMetricLo and ospfMatchRuleMetricHi must have the same value. This field is meaningful only in case the metricValueFilter bit in the ospfMatchRuleMask is set"
::={ospfMatchRuleEntry 8}
ospfMatchRuleMetricHi OBJECT-TYPE
SYNTAX INTEGER
MAX-ACCESS read-create
STATUS current
DESCRIPTION "This field contain a lower metric value to be used for a metric filter. In order to match, routes must have a metric value less or equal to the value reported in this field. This field is used together with ospfMatchRuleMetricLo to identify a range of metrics. In order to identify a single value, ospfMatchRuleMetricLo and ospfMatchRuleMetricHi must have the same value. This field is meaningful only in case the metricValueFilter bit in the ospfMatchRuleMask is set"
::={ospfMatchRuleEntry 9}
ospfMatchRuleTagLo OBJECT-TYPE
SYNTAX INTEGER
MAX-ACCESS read-create
STATUS current
DESCRIPTION "This field contain a lower tag value to be used for a tag value filter. In order to match, routes must have a tag value higher or equal to the value reported in this field. This field is used together with ospfMatchRuleTagHi to identify a range of tag values. In order to identify a single value, ospfMatchRuleTagLo and ospfMatchRuleTagHi must have the same value. This field is meaningful only in case the tagValueFilter bit in the ospfMatchRuleMask is set"
::={ospfMatchRuleEntry 10}
ospfMatchRuleTagHi OBJECT-TYPE
SYNTAX INTEGER
MAX-ACCESS read-create
STATUS current
DESCRIPTION "This field contain a higher tag value to be used for a tag value filter. In order to match, routes must have a tag value less or equal to the value reported in this field. This field is used together with ospfMatchRuleTagLo to identify a range of tag value. In order to identify a single value, ospfMatchRuleTagHi and ospfMatchRuleTagLo must have the same value. This field is meaningful only in case the tagValueFilter bit in the ospfMatchRuleMask is set"
::={ospfMatchRuleEntry 11}
ospfMatchRuleDirection OBJECT-TYPE
SYNTAX INTEGER {import (1),
    export (2)}
MAX-ACCESS read-create
STATUS current
DESCRIPTION "This field is used to identify whether the filter is associated to imported or exported routes. This field is meaningful only in case the routeMapFromProtocol and routeMapToProtocol in the routeMapTable row referring this one, have the same value and the value is 'ospf'. In all other cases the value is not meaningful."
::={ospfMatchRuleEntry 12}
ospfMatchRuleAddressList OBJECT-TYPE
SYNTAX INTEGER
MAX-ACCESS read-create
STATUS current
DESCRIPTION "This field is used to identify a set of hosts in the routeMapHostTable. This field is meaningful only in case the routeMapFromProtocol and routeMapToProtocol in the routeMapTable row referring this one, have the same value and the value is 'ospf'. In all other cases the value is not meaningful."
::={ospfMatchRuleEntry 13}
ospfMatchRuleRowStatus OBJECT-TYPE
SYNTAX RowStatus
MAX-ACCESS read-create STATUS current
DESCRIPTION
"This variable displays the status of the entry. Disabled entries are not taken into account when performing filter activities."
::={staticRouteMatchRuleEntry 14}
routeMapHostTable OBJECT-TYPE
SYNTAX SEQUENCE OF RouteMapHostEntry
MAX-ACCESS not-accessible
STATUS current
DESCRIPTION "It contains all the set of hosts/subnetworks addresses used by a match rule filter"
::={xxx xxx}
routeMapHostEntry OBJECT-TYPE
SYNTAX RouteMapHostEntry
MAX-ACCESS not-accessible
STATUS current
DESCRIPTION "An entry describing an host or a subnetwork address associated to a set of hosts/subnetworks addresses"
INDEX {routeMapHostSequenceId, routeMapHostAddress, routeMapHostMask}
::={routeMapHostTable 1}
RouteMapHostEntry::=
  SEQUENCE {routeMapHostSequenceId INTEGER,
    routeMapHostAddress IpAddress,
    routeMapHostMask IpAddress,
    routeMapHostRowStatus RowStatus}
routeMapHostSequenceId OBJECT-TYPE
SYNTAX INTEGER
MAX-ACCESS not-accessible
STATUS current
DESCRIPTION "This field is used to identify the set of addresses to which the host/subnetwork address belongs"
::={routeMapHostEntry 1}
routeMapHostAddress OBJECT-TYPE
SYNTAX INTEGER
MAX-ACCESS not-accessible
STATUS current
DESCRIPTION "This field contains an host address to be used together with the host address mask in order to select a range of host addresses all resident in the same subnet."
::={routeMapHostEntry 2}
routeMapHostMask OBJECT-TYPE
SYNTAX IpAddress
MAX-ACCESS not-accessible
STATUS current
DESCRIPTION "This field contains a host address mask to be used together with the host address in order to select a range of host addresses all resident in the same subnet. An "all one" mask is needed to select a single address. An "all zero" mask is needed to create an entry that selects all the addresses."
::={routeMapHostEntry 3}
routeMapHostRowStatus OBJECT-TYPE
SYNTAX RowStatus
MAX-ACCESS read-create
STATUS current
DESCRIPTION "This variable displays the status of the entry. Disabled entries are not taken into account when performing filtering activities"
::={routeMapHostEntry 4}
importBlockingTable OBJECT-TYPE
SYNTAX SEQUENCE OF ImportBlockingEntry
MAX-ACCESS not-accessible
STATUS current
DESCRIPTION "It contains all the set of hosts/subnetworks addresses used by a match rule filter"
::={xxx xxx}
importBlockingEntry OBJECT-TYPE
SYNTAX ImportBlockingEntry
MAX-ACCESS not-accessible
STATUS current
DESCRIPTION "An entry describing an host or a subnetwork address associated to a set of hosts/subnetworks addresses"
INDEX {importBlockingFromProtocol, importBlockingToProtocol}
::={importBlockingTable 1}
ImportBlockingEntry::=
  SEQUENCE {importBlockingFromProtocol INTEGER,
    importBlockingToProtocol INTEGER,
    importBlockingRowStatus RowStatus}
importBlockingFromProtocol OBJECT-TYPE
SYNTAX INTEGER {anyProtocol (1),
  ospf (13),
  bgp (14)}
MAX-ACCESS not-accessible
STATUS current
DESCRIPTION "This field is used to identify the exporting protocol. Routes exported from importBlockingFromProtocol cannot be imported into importBlockingToProtocol."
::={importBlockingEntry 1}
importBlockingToProtocol OBJECT-TYPE
SYNTAX INTEGER {anyProtocol (1),
  ospf (13),
  bgp (14)}
MAX-ACCESS not-accessible
STATUS current
DESCRIPTION "This field is used to identify the importing protocol. Routes exported from importBlockingFromProtocol cannot be imported into importBlockingToProtocol."
::={importBlockingEntry 2}
importBlockingRowStatus OBJECT-TYPE
SYNTAX RowStatus
MAX-ACCESS read-create
STATUS current
DESCRIPTION "This variable displays the status of the entry. Disabled entries are not taken into account"
::={importBlockingEntry 3}
ospfSetRuleTable OBJECT-TYPE
SYNTAX SEQUENCE OF OspfSetRuleEntry
MAX-ACCESS not-accessible
STATUS current
DESCRIPTION "Information describing the actions (conditions) that must be applied to the routes selected for export into ospf"
::={xxx xxx}

```
ospfSetRuleEntry OBJECT-TYPE
  SYNTAX OspfSetRuleEntry
  MAX-ACCESS not-accessible
  STATUS current
  DESCRIPTION "An entry in the action (condition) table for routes exported
to ospf protocol"
  INDEX {ospfSetRuleId}
  ::={ospfSetRuleTable 1}
OspfSetRuleEntry::=
    SEQUENCE {ospfSetRuleId INTEGER,
      ospfSetRuleRuleMask BITS,
      ospfSetRuleLsaType INTEGER,
      ospfSetRuleMetricType INTEGER,
      ospfSetRuleMetricValue INTEGER,
      ospfSetRuleMetricScale Unsigned32,
      ospfSetRuleTag INTEGER,
      ospfSetRuleRowStatus RowStatus}
ospfSetRuleId OBJECT-TYPE
  SYNTAX INTEGER
  MAX-ACCESS not-accessible
  STATUS current
  DESCRIPTION "This field is used to identify an entry. An entry is associated
to a rule when the routeMapSetRule field of a routeMapT-
able entry contains the same value reported in this field"
  ::={ospfSetRuleEntry 1}
ospfSetRuleMask OBJECT-TYPE
  SYNTAX BITS {RedistributedLsaTypeSet (0),
    metricTypeSet (1),
    metricValueSet (2),
  tagValueSet (3)}
  MAX-ACCESS read-create
  STATUS current
  DESCRIPTION "This field is used to select the conditions that must be
applied. For not selected conditions a default dependent
from the condition is applied."
  ::={ospfSetRuleEntry 2}
ospfSetRuleLsaType OBJECT-TYPE
  SYNTAX INTEGER {lsaType5 (1),
    lsaType7 (2),
    lsaInternal (3)}
  MAX-ACCESS read-create
  STATUS current
  DESCRIPTION "This field contains the kind of LSA that ospf has to use for
the advertisement of the imported routes selected by the
filters. Type 7 LSAs can be only used in case the router that
imports the routes belongs to a not so stubby area. This field
is meaningful only in case the redistributedLsaTypeSet bit in
the ospfSetRuleMask is set. The value lsaInternal is valid
only in case importing/exporting to OSPF. In case the
redistributedLsaTypeSet bit in the ospfSetRuleMask is not
set the route will be advertised using type 5 LSAs"
  DEFVAL {lsaType5}
  ::={ospfSetRuleEntry 3}
ospfSetRuleMetricType OBJECT-TYPE
  SYNTAX INTEGER {ospfExternalType1 (1),
    ospfExternalType2 (2),
    ospfInternal (3)}
  MAX-ACCESS read-create
  STATUS current
  DESCRIPTION "This field contains the kind of metric that ospf has to use
for the advertisement of the imported routes selected by the
filters. This field is meaningful only in case the metricType-
Set bit in the ospfSetRuleMask is set. The value ospfInternal
is valid only when importing from OSPF protocol. In case
the metricTypeSet bit in the ospfSetRuleMask is not set the
route will be advertised using the external type 2 metric"
  DEFVAL {ospfExternalType2}
  ::={ospfSetRuleEntry 4}
ospfSetRuleMetricValue OBJECT-TYPE
  SYNTAX INTEGER
  MAX-ACCESS read-create
  STATUS current
  DESCRIPTION "This field contains the value of the metric that ospf has to
use for the advertisement of the imported routes selected by
the filters. This field is meaningful only in case the met-
ricValueSet bit in the ospfSetRuleMask is set. In case the
metricValueSet bit in the ospfSetRuleMask is not set the
route will be advertised using the metric value 10."
  DEFVAL {10}::={ospfSetRuleEntry 5}
ospfSetRuleMetricScale OBJECT-TYPE
  SYNTAX Unsigned32
  MAX-ACCESS read-create
  STATUS current
  DESCRIPTION "This field contains the value that ospf has to use, together
with ospfSetRuleMetricValue to transform the imported
metric into an ospf-understandable metric. If the metric of
the route to be imported is X, then the ospf metric is
calculated with the formula
```

$$M = X * ospfSetRuleMetricScale + ospfSetRuleMetricValue.$$

Note that this field is coded as a fixed-point unsigned decimal value, where the uppermost 16 bits are for the integer part and the remaining 16 bits are for the fractional part. This field is meaningful only in case the metricScaleSet bit in the ospfSetRuleMask is set. In case the metricValueSet bit in the ospfSetRuleMask is not set the route metric will be calculated using a default value of 0, that is equivalent to use only ospfSetMetricValue in the above formula."
  DEFVAL {0}::={ospfSetRuleEntry 6}
ospfSetRuleTag OBJECT-TYPE
  SYNTAX INTEGER
  MAX-ACCESS read-create
  STATUS current
  DESCRIPTION "This field contains the value of the tag that ospf has to use
for the advertisement of the imported routes selected by the
filters. This field is meaningful only in case the tagValueSet
bit in the ospfSetRuleMask is set. In case the tagValueSet bit
in the ospfSetRuleMask is not set the route will be adver-
tised with no associated tag."
  ::={ospfSetRuleEntry 7}
ospfSetRuleRowStatus OBJECT-TYPE
  SYNTAX RowStatus
  MAX-ACCESS read-create
  STATUS current
  DESCRIPTION "This variable displays the status of the entry. Disabled
entries are not taken into account when performing set
activities."
  ::={ospfSetRuleEntry 8}

We claim:

1. A method for sharing, within a network element of a telecommunication network, routing information deriving from a first routing source, wherein the network element comprises:
a management agent provided with a management information database, wherein different routing information deriving from different routing sources is stored in different routing databases within the network element, wherein the management agent performs the functions of:
receiving from a management manager route mapping information;
storing into the management information database route mapping information corresponding to the received route mapping information; and
retrieving and using the stored route mapping information for exporting said routing information from a first routing database of the first routing source and importing it into a second routing database of a second routing source.

2. The method according to claim 1, wherein said stored route mapping information comprises information relating to at least one mapping rule, and wherein the or each mapping rule comprises information relating to:
a set rule for conversion of routing information, particularly for metric conversion; and
a match rule indicating to which routing information said set rule applies.

3. The method according to claim 2, wherein:
the information relating to a match rule consists in a pointer to an entry of at least one match rule table comprised in said management information database;
the information relating to a set rule consists in a pointer to an entry of at least one set rule table comprised in said management information base.

4. The method according to claim 3, wherein:
a) each entry in the or each match rule table comprises information relating to at least a destination network address, and a destination network address mask;
b) each entry in the or each set rule table comprises information relating to at least a metric value, and a metric scale.

5. The method according to claim 2, wherein the or each mapping rule comprises further information relating to:
an exportation routing source,
an importation routing source,
an activation flag indicating whether the corresponding mapping rule is actually to be used for exportation-importation,
a selection flag indicating whether the corresponding match rule applies or does not apply,
an index indicating the order of precedence of the corresponding mapping rule.

6. The method according to claim 2, wherein the route mapping information is stored within said management information database as a table, wherein each entry in the table corresponds to a different mapping rule.

7. The method according to claim 2, wherein the match rule indicates:
to which routing network addresses the corresponding set rule applies;
whether the exportation routing source is internal or external to said network element;
whether the importation routing source is internal or external to said network element; and
to which external routing source or sources the corresponding set rule applies.

8. The method according to claim 1, wherein the different routing databases are managed by a route manager and the management agent instructs the route manager to carry out exportation-importation of routing information.

9. The method according to claim 2, wherein the management agent carries out exportation-importation of routing information taking into account eventual import-export blocking information stored, preferably as a table, within said management information database, wherein said blocking information identifies at least one couple of routing sources, and wherein said blocking information overrides the route mapping information.

10. The method according to claim 1, wherein said first routing source comprises one of a routing protocol running within said network element, a routing protocol running within any neighbouring network element in the telecommunication network, and a management manager external to said network element.

11. The method according to claim 10, wherein the first and the second routing sources are of a same kind.

12. A memory means storing a processor program product comprising program code portions adapted to perform the steps of the method according to claim 1 when executed by a processor.

13. The method according to claim 1, wherein said different routing sources comprise a Boarder Gateway Protocol and Open Shortest Path First Protocol.

14. A computer readable medium storing a processor program product comprising program code portions adapted to perform the steps of a method for sharing, within a network element of a telecommunication network, routing information deriving from a first routing source, wherein the network element comprises:
a management agent provided with a management information database, wherein different routing information deriving from different routing sources is stored in different routing databases within the network element, when executed by a processor,
wherein the management agent performs the functions of:
receiving from a management manager route mapping information;
storing into the management information database route mapping information corresponding to the received route mapping information; and
retrieving and using the stored route mapping information for exporting said routing information from a first routing database of the first routing source and importing it into a second routing database of a second routing source.

15. A network element comprising a computer readable medium embodied on a processor of the network element of a telecommunication network provided with a management information database and comprising a management agent, wherein the management information database stores route mapping information and the management agent carries out a sharing method, wherein the network element comprises:
the management agent provided with the management information database, wherein different routing information deriving from different routing sources is stored in different routing databases within the network element,
wherein the management agent performs the functions of:
receiving from a management manager route mapping information;
storing into the management information database route mapping information corresponding to the received route mapping information; and retrieving and using the stored route mapping information for exporting said routing information from a first routing database of the first routing source and importing it into a second routing database of a second routing source.

16. A method for sharing, within a network element of a telecommunication network, routing information deriving from a first routing source, wherein the network element comprises:

a management agent provided with a management information database, a plurality of routing databases, wherein said routing information is stored in different routing databases according to the routing source from which said routing information is derived, wherein the management agent:

receives from a management manager route mapping information;

stores into the management information database the route mapping information corresponding to the received route mapping information; and retrieves and uses the stored route mapping information for exporting said routing information from a first routing database of the first routing source and importing it into a second routing database of a second routing source.

17. A method for sharing, within a network element of a telecommunication network, routing information deriving from a first routing source, wherein the network element comprises:

a management agent provided with a management information database, wherein said routing information is stored in different routing databases according to the routing source from which said routing information is derived, wherein the management agent:

stores into the management information database route mapping information; and retrieves and uses the stored route mapping information for exporting said routing information of the first routing source and importing it into a routing database of a second routing source.

* * * * *